United States Patent [19]

Iwatani et al.

[11] Patent Number: 5,432,899
[45] Date of Patent: Jul. 11, 1995

[54] METHOD FOR MANAGING RESOURCES AND INFORMATION PROCESSING SYSTEM

[75] Inventors: Takao Iwatani, Fujisawa; Hideki Kuwamoto, Yokohama; Tadashi Kuwabara, Yokohama; Tsukasa Hasegawa, Yokohama, all of Japan

[73] Assignee: Hitachi, Ltd., Tokyo, Japan

[21] Appl. No.: 901,744

[22] Filed: Jun. 22, 1992

[30] Foreign Application Priority Data

Jun. 27, 1991 [JP] Japan .................................. 3-157173

[51] Int. Cl.⁶ .............................................. G06K 15/00
[52] U.S. Cl. ...................................................... 395/145
[58] Field of Search ............... 395/145, 144, 148, 155, 395/161; 345/127, 128

[56] References Cited

U.S. PATENT DOCUMENTS 5,047,957  9/1991  Ikenoue ................................ 364/519
5,068,807  11/1991  Ikenoue ................................ 364/519

FOREIGN PATENT DOCUMENTS 58-141058  8/1983  Japan .
63-288318  11/1988  Japan .
3-134769   6/1991  Japan .

Primary Examiner—Phu K. Nguyen
Attorney, Agent, or Firm—Fay, Sharpe, Beall, Fagan, Minnich & McKee

[57] ABSTRACT

A method for managing resources and an information processing system having three or more information processing units, with one unit functioning as a server and the other two or more units functioning as clients. A client unit can send a first resource, such as a document file, to the server unit for processing, such as printing the first resource. A second resource, such as character fonts, is generally required for processing the first resource if the server does not hold the second resource information. Together with the first resource, the client unit sends address information about the location of the second resource to the server unit. If the private character code is included in the character string, the server reads the private character font corresponding to the client which created the document file. Unfavorable change of a private character sent from a client to the server each time a new client is added to the system is avoided. Consequently, the document file may be processed, e.g. printed, by the server unit.

24 Claims, 11 Drawing Sheets

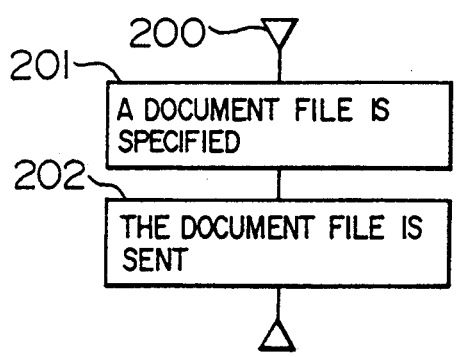
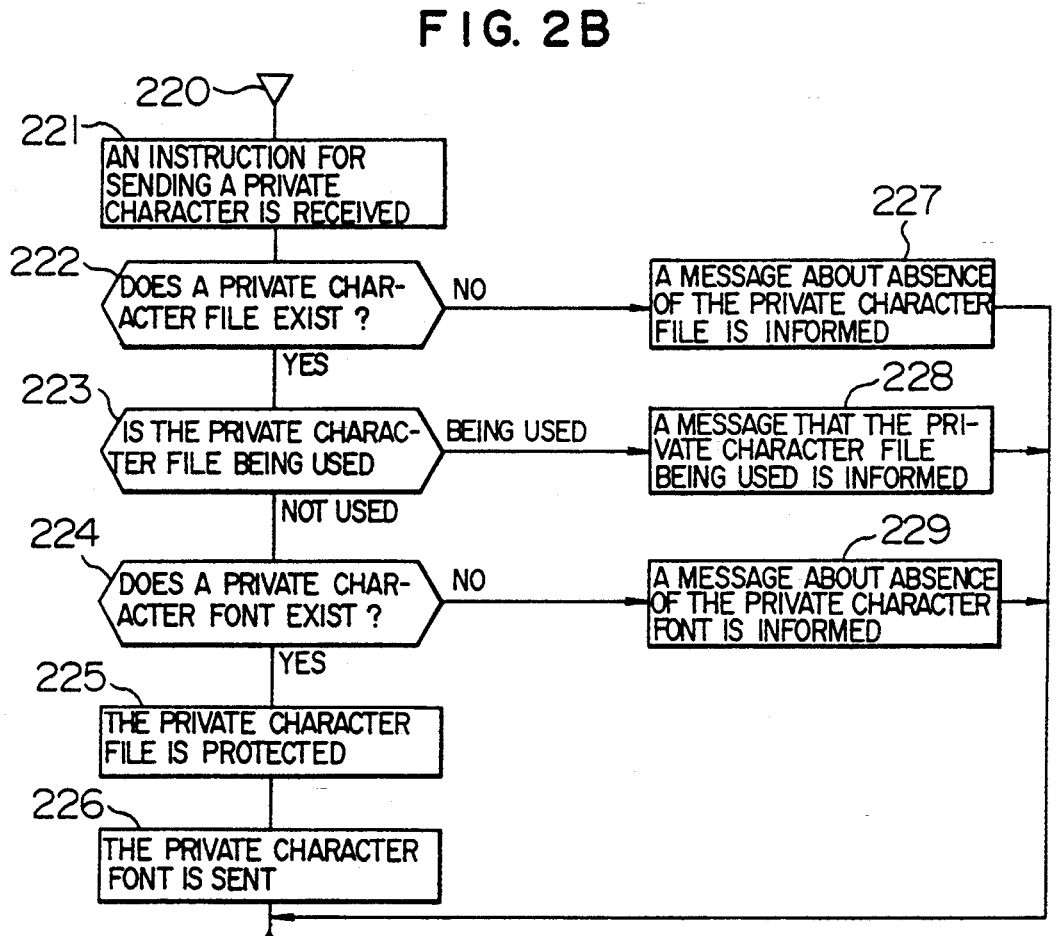
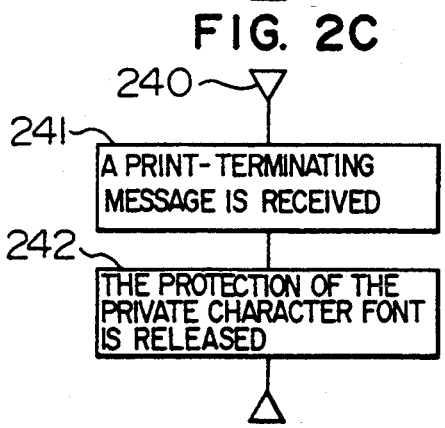
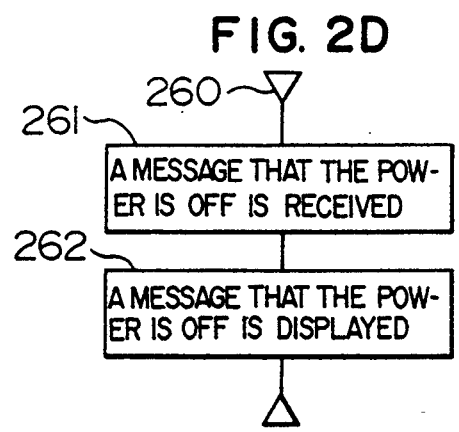

METHOD FOR MANAGING RESOURCES AND INFORMATION PROCESSING SYSTEM

BACKGROUND OF THE INVENTION

The present invention relates to an information processing system having two or more information processing units connected through a data transmission means such as a communication line, one unit functioning as a server and another unit functioning as a client, and more particularly to a method for managing resources in a case where for processing a first resource such as document data requested to a server by a client, a second resource such as private character fonts is required and the information processing system for implementing the managing method.

As an example of the information processing system having two or more information processing units connected through a data transmission means such as a communication line, one unit functions as a server for doing printing and another unit function as a client for requesting the server unit to do printing.

In such a system, when the document data created by a client is sent to the server for printing the document, the document may include any private character or external character (also called user's defined character). In this case, it is considered that the client has a private character font corresponding to the private character code included in the document data to be printed, while the server does not have it. When, therefore, the client requests the server to print the document, the server needs the document data to be printed and the additional data such as the private character font concerning the document data. The additional data is sent from the client to the server, for example, as disclosed JP-A-63-288318.

Consider an information processing system in which a plurality of clients use one server. Each time one client is changed to another, the private character fonts sent from the previous client are deleted in the server and the new private character fonts are required to be down-loaded from a new client to the server.

To meet the requirement, a storage area for each client is provided in the server so that the private character fonts for each client may be stored in the corresponding storage area. This arrangement makes it possible to avoid down-loading the private character fonts each time a client is changed to a new one, which is disclosed in Ikenoue U.S. Pat. Nos. 5,047,957 and 5,068,807.

This technical arrangement disadvantageously loads the server too much, because the server needs to store the private character fonts for each client. Hence, this is not feasible. Moreover, if the same client may use the private characters respectively corresponding to the documents, the storage area for the client is required to be rewritten.

As another technique, it is considered that the server holds the private character fonts commonly to all the possible clients and each client sends the font to the server if the server does not hold but needs the font to print the document. That is, when the document including one or more private characters is transferred between the information processing units, it is determined whether or not the communication is executable between these units. If yes, the character codes of the document are transferred and if one or more character codes include one or more private character codes, the corresponding private character fonts are also transferred together with the character codes. The technique related to this is disclosed in JP-A-58-141058.

The foregoing conventional technique is arranged so that the information processing unit on the sending side may determine whether or not each character code indicates a private character when the character codes and the private character fonts are transferred from the sending unit to the receiving unit. This technique, therefore, consumes long time when transferring the character codes. For example, if the information processing unit on the receiving side prints the document, it is determined whether or not each character code included in the document data indicates a private character on the receiving side, again. It means that the determining process has to be executed twice. This wastes too long time in processing.

On the other hand, in a case where the second resource such as one or more private character fonts is needed for processing the first resource such as document data to be printed as requested to a server by a client, the second resource is not necessarily held in the requesting client. Another client may often hold the second resource. The conventional information processing system, however, is arranged on the assumption that the document data to be printed and the private character fonts needed for printing the document are held in one client. If a user changes one client to another for printing the corresponding document, the situation may take place wherein the private character fonts corresponding to the private character codes included in the document data are not held in the client sending the document data. In this case, the server disables to process the request of printing the document. The conventional system, therefore, requires just one client to create the unity document. This restricts the promotion of the system, so that the user has difficulty in freely creating the data such as a document without having to be conscious of the attributes of the clients.

SUMMARY OF THE INVENTION

It is an object of the present invention to provide a method for managing resources and an information processing system in which if an information processing unit functioning as a client requests another information processing unit functioning as a server to process a first resource (for example, print a document) and the server unit does not hold a second resource such as a private character, merge data, and a fixed form required to process the first resource, the second resource is allowed to be read from the client unit or another information processing unit in accordance with the information indicating a location of the second resource for the purpose of properly processing the first resource.

It is another object of the present invention to provide a method for managing resources and an information processing system which are arranged to transfer a first resource from an information processing unit functioning as a client to another information processing unit functioning as a server without having to determine whether or not the server unit holds a second resource needed for processing the first resource on the side of the client, for the purpose of saving the necessary time for determining it.

In order to achieve the object, according to an aspect of the invention, in an information processing system having two or more information processing units connected through a data transmission means a method for managing resources comprises the steps of sending a first resource to be processed, together with information indicating an address of at least one second resource required for processing the first resource, from an information processing unit functioning as a client to another information processing unit functioning as a server when the client requests the server to process the first resource, checking whether or not the server holds each of the second resources required for processing the first resource on the side of the server itself, if not, receiving the second resources from an information processing unit having the second resources, based on the information indicating an address of the second resource, and processing the first resource using the received second resources.

The first resource includes document data, for example. The second resource includes a private character font, merge data and a fixed form. The merge data include data such as a graphic, a table, a ruled line, a numerical expression, and a numerical value.

The information indicating the address of the second resource may be an identifier indicating the information processing unit having the second resource and a name of a file for storing the second resource.

If the second resource is a private character font, for indicating the address of the second resource, it is possible to provide a means of holding in the document data the information about the address of a private character file for storing the private character codes and the private character fonts corresponding to the codes.

When a new font for the same private character code is created and is registered in the private character file, the update time of the font is recorded and the latest update time is provided to the font data as the information indicating a font version. In this case, the information indicating the version of the private character font is allowed to be held in the document data as corresponding to the private character code.

According to another aspect of the invention, an information processing system having at least two information processing units and a data transmission means connecting these units includes, for the information processing unit functioning as a client, means for applying to a first resource the information indicating an address of at least one second resource required for processing the first resource, and means for transmitting the first resource to the other information processing unit functioning as a server, for the information processing unit functioning as a server, means for determining whether or not the server holds the second resource required for processing the first resource, if not, means for requesting the information processing unit having the second resource to send the second resource, based on the information indicating the address of the second resource, means for receiving the second resource transmitted from the information processing unit, and means for processing the first resource with the second resources held in the server and/or received from another information processing unit.

In operation, when the client requests the server to process the first resource, the client applies the first resource to the information indicating the address of at least one second resource required for processing the first resource. The information may be an identifier indicating the information processing unit (the client unit, the server unit, another information processing unit) having the second resource held therein and a name of a file for storing the second resource. The client sends to the server the first resource together with the information indicating the information processing unit having the second resource held therein, for implementing the request of processing the first resource.

The server checks whether or not the server itself holds each of the second resources required for processing the first resource by referring to the information indicating the information processing unit having the second resource held therein. If the server does not hold the necessary second resources, the server requests the information processing unit to transfer the second resource from the unit to the server itself, based on the information indicating the location of the second resource. The server temporarily stores the second resources held in the server itself and the other information processing units including the client and processes the first resource by using these second resources.

In the case where the client requests the server to process the first resource, the server enables to correctly and efficiently process the first resource if the second resource required for processing the first resource is held not in the server but in the client.

BRIEF DESCRIPTION OF THE DRAWINGS

FIGS. 2A to 2D are flowcharts showing a process of sending a document file, a process of sending a private character font, and a process for terminating a printing process, executed by the client;

DESCRIPTION OF THE PREFERRED EMBODIMENTS

Figure 1A:
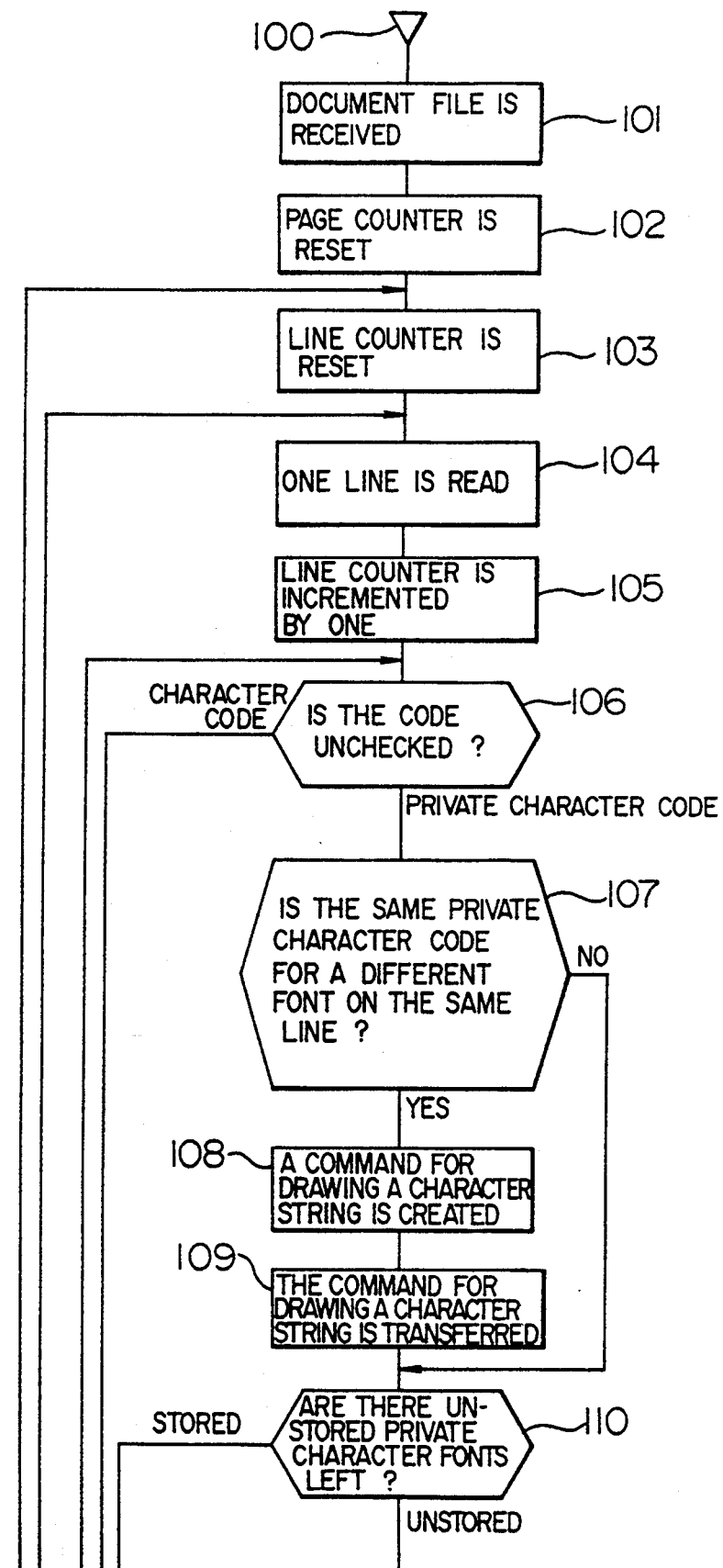
FIGS. 1A-1C collectively are flowcharts showing a printing process executed by a server according to a first embodiment of the present invention.

Description will be made of embodiments of the present invention as referring to the drawings.

According to an embodiment of the invention, the present invention is applied to an information processing system having a server 1 for printing and one or more clients 2 for requesting a printing process.

At first, a relation between a server and a client will be described as referring to a connecting relation shown in FIG. 3. This relation is applied to this embodiment and the other embodiments to be described later. A communication between a server 1 and clients 2a and 2b is executed through a LAN (Local Area Network) 3 for sending or receiving a document file, one or more private character codes, and one or more private character fonts. The server 1 receives the document file from the client 2 (2a, 2b), if the private character code is included in the document file, reads the private character font corresponding to the private character code from the client or the server holding the font, and prints the document. Herein, the private character is defined as a character or character string configured of one or more symbols and logos created by a user. The private character code is common to all the document files. The private character font corresponding to the private character code is individually created for each document file. Hence, the same private character code does not correspond to the same font in each document file.

The clients 2a and 2b serve as clients for requesting the server 1 to process a work. The information processing units which do not request the server 1 to process the work are considered as the other irrelevant information processing units viewed in light of the work.

Figure 3:
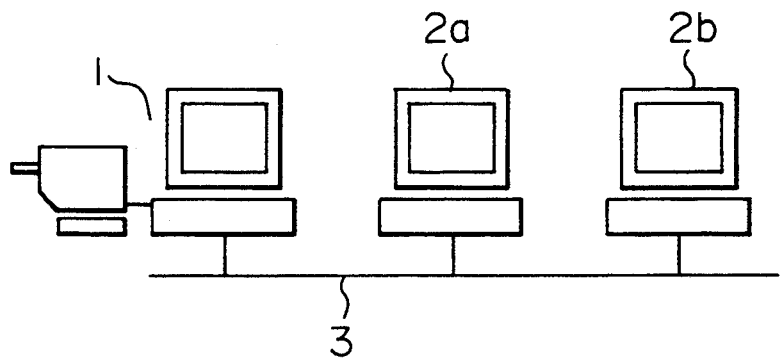
FIG. 3 is a block diagram showing a connecting relation between a server and/clients.

Next, FIG. 4 shows a hardware arrangement of the server 1 and the client 2 shown in FIG. 3.

Figure 4A:
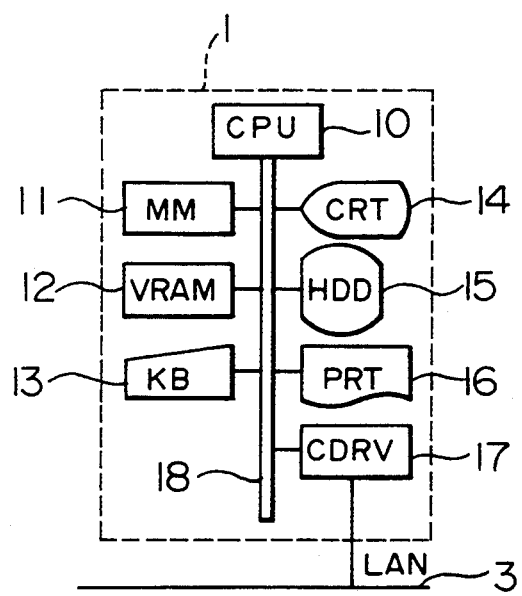
FIGS. 4A and 4B are hardware diagrams showing the server and client shown in FIG. 3.

At first, the hardware arrangement of the server 1 will be described as referring to FIG. 4A.

The server 1 is an information processing unit for printing a document (print server). The server 1 is arranged to have a central processing unit (CPU) 10, a main memory (MM) 11, a video memory (VRAM) 12, a keyboard (KB) 13, a display device (CRT) 14, a hard disk device (HDD) 15, a printer (PRT) 16, a communication control unit (CDRV) 17, and a bus 18 connecting those devices.

The central processing unit (CPU) 10 operates to print a document file on the main memory (MM) 11, execute various programs about sending or receiving of the document file and the private character fonts, and control peripheral devices. The content of the display data stored in the video memory (VRAM) 12 under the control of the CPU 10 is displayed on the display device (CRT) 14. For inputting a printing indication, the keyboard (KB) 13 is used. The hard disk device (HDD) 15 serves to store various programs about printing of the document file and sending and receiving of the document file and the private character font, the document file, and the private character file storing the private character fonts. The printer (PRT) 16 serves to register in a font ROM the private character font corresponding to a private character code when the command for registering a private character is transferred from the CPU 10. When a command for drawing a character string is transferred from the CPU 10, the printer 16 serves to expand the transferred character or private character in a page memory included in the printer 16 itself. When a command for starting the printing is transferred from the CPU 10, the data is outputted from the page memory for printing. The communication control unit (CDRV) 17 serves to communicate with the client 2 through the LAN 3. The data transfer between those peripheral devices 11 to 16 and the CPU 10 is executed through the bus 18.

With the foregoing hardware system, the server 1 enables to implement the following functions.

(1) a function of storing a first resource file for storing a first resource (document data) the client requests to process, (2) a function of storing a second resource file for storing a second resource (private character font data) used for processing the first resource in the server, (3) a function of receiving the first resource from the client, (4) a function of sending an instruction for sending the second resource to the client storing the second resource file, (5) a function of receiving the second resource from the client, (6) a function of storing the received first resource in the first resource file, and (7) a function of storing the received second resource in the second resource file.

Figure 4B:
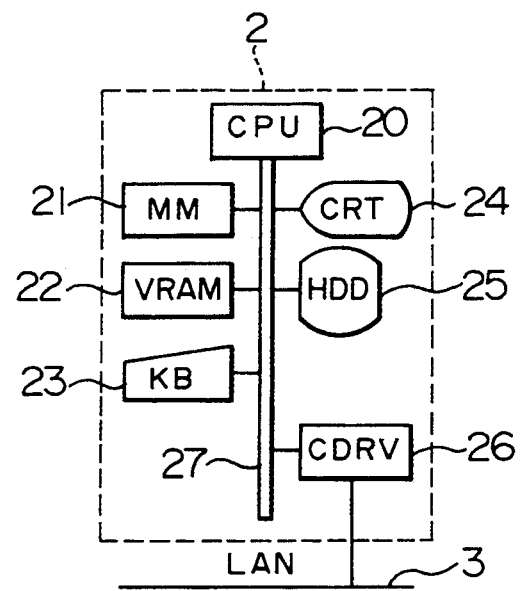

In turn, the description will be directed to the hardware arrangement of the client 2 as referring to FIG. 4B.

The client 2 is an information processing unit for creating or editing a document to be printed. The client 2 is arranged to have a central processing unit (CPU) 20, a main memory (MM) 21, a video memory (VRAM) 22, a keyboard (KB) 23, a display device (CRT) 24, a hard disk device (HDD) 25, a communication control unit (CDRV) 26, and a bus 27 connecting those devices.

The central processing unit (CPU) 20 operates to execute various programs about the sending and receiving of the document file and the private character font, and control the peripheral devices. The content of the display data stored in the video memory (VRAM) 22 under the control of the CPU 20 is displayed on the display device (CRT) 24. For inputting some indications such as a printing one, the keyboard (KB) 23 is used. The hard disk device (HDD) 25 serves to store various programs about the printing of the document file and the sending and receiving of the document file and the private character font, the document file, and the private character file. The communication control unit (CDRV) 26 serves to do communication with the server 1 through the LAN 3. The data transfer between the CPU 20 and those peripheral devices 21 to 25 is executed through the bus 27.

With the above-described hardware system, the client can implement the following functions.

Figure 5:
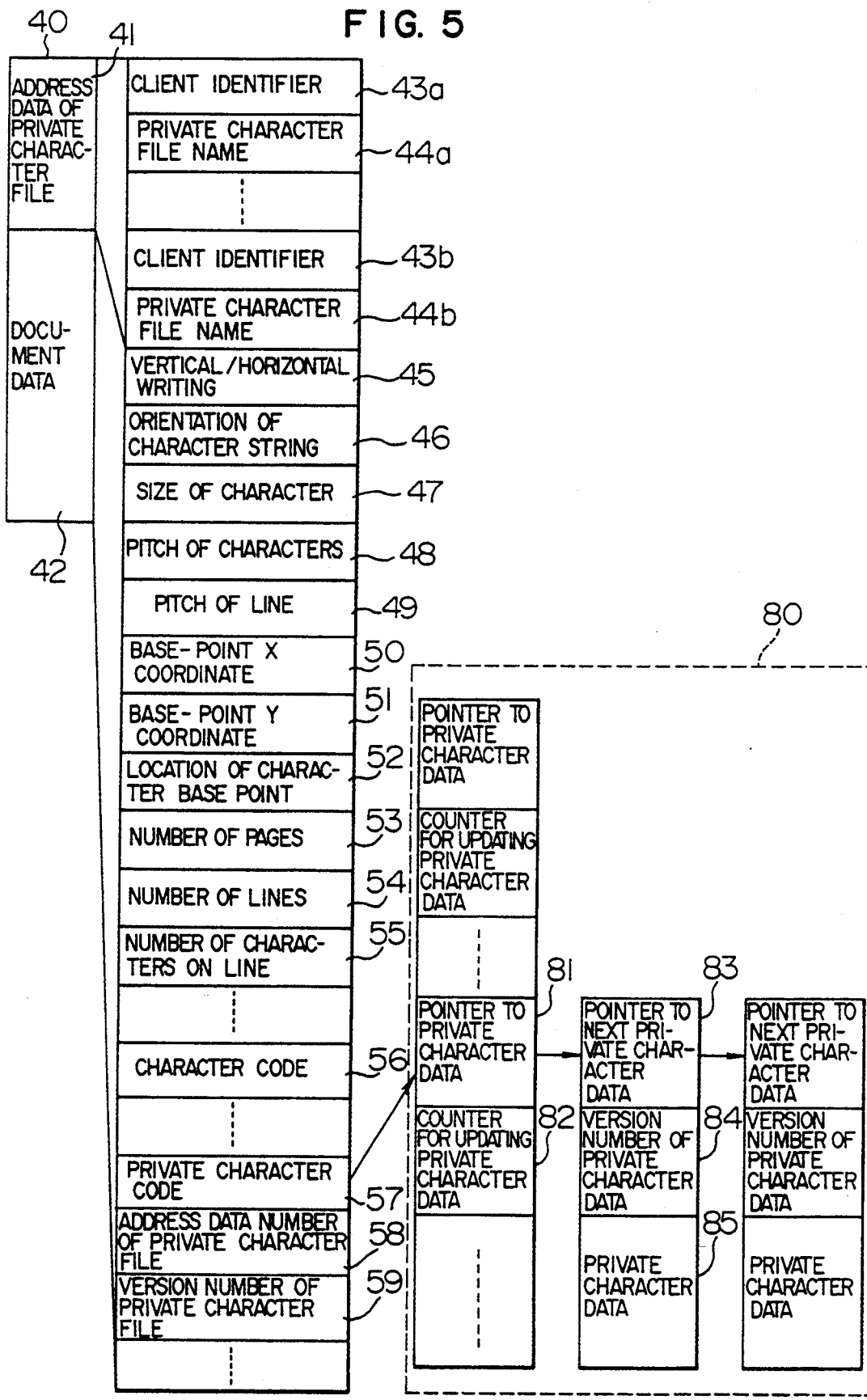
FIG. 5 is an explanatory view showing an arrangement of a document file and a private character file used in the first embodiment of the present invention.

(1) a function of storing a first resource file for storing a first resource (document data), (2) a function of storing a second resource file for storing a second resource (private character font data), (3) a function of applying to the first resource an address of a client/server having the second resource used for processing the first resource and a name of the second resource file, (4) a function of sending the first resource to the server, (5) a function of receiving an instruction for sending the second resource, and (6) a function of sending the second resource to the server Next, the arrangements of the document file and the private character file will be described as referring to FIG. 5.

At first, the document file 40 will be described.

The document file 40 is arranged to have a document data 42 containing character codes and private character codes described therein and a private character file address data 41 indicating an address of a private character file 80 for storing the font of each private character used in the document data stored in the document file 40 itself.

The private character file address data 41 contains an identifier 43 and a private character file name 44. The identifier 43 indicates a client 2 or a server 1 having the private character file 80 for storing the font corresponding to each private character code of the document data 42. When a private character file is used in the document file for the first time, the combination of the identifier 43 of the client holding the private character file and the private character file name 44 is added to the document file 40 as the private character file address data 41.

The document data 42 contains parameters 44 to 55 for regulating the arrangement of a document, a character code 56, a private character code 57, a private character address data number 58 served as a parameter indicating an address of a private character font corresponding to the private character code, and a private character font version number 59. The private character file address data number 58 is a pointer to one combination of the client identifier 43 and the private character file name 44 indicating an address of the private character font for the private character code 57. When the private character file address data number 58 takes a value of 1, it points to the head of the combination of the client identifier 43 and the private character file name 44. The private character font version number 59 corresponds to the version number of the private character data composing the private character font for the private character code 57 in the private character file 80.

Figure 11:
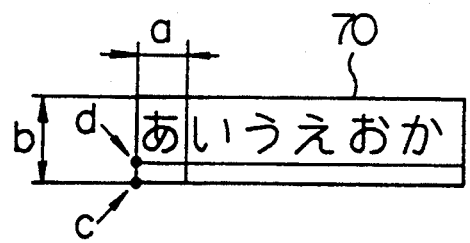
FIG. 11 is an explanatory view showing an expansion of a character.

The partial content of the parameters 45 to 55 for regulating the arrangement of the document will be described as referring to the expansion of the character shown in FIG. 11. In FIG. 5, reference numerals 50 and 51 denote a base-point X coordinate and a base-point Y coordinate on which a coordinate c of a base point of the head line of a character string 70 is defined. A numeral 49 denotes a value of b for defining a line pitch of the character string 70. A numeral 48 denotes a value of a character width a. A numeral 52 denotes a value of a character base point d. A numeral 45 denotes a vertical/horizontal writing specification for specifying if the characters are ranged in a vertical or horizontal manner. A numeral 46 denotes a character-string orientation specification for specifying the orientation, that is, the upper, the lower, the left and the right, of the character string 70 with respect to the base-point coordinate c. A numeral 47 denotes a character size indicating a size of each 24-dot 32-dot font. A numeral 53 denotes the number of pages in the document file. A numeral 54 denotes the number of lines for each page. A numeral 55 denotes the number of characters for each line.

Next, the private character file 80 will be described.

The private character file 80 contains a pointer 81 to the private character data indicating an address of the latest private character data composing a private character font for a private character code, a private character data update counter 82 indicating an update time of a private character font for the private character code, a pointer 83 to the next private character data indicating an address of a next private character data, a private character data version number 84 indicating a version of the private character data, and a private character data 85 composing a created or updated private character font. The private character data update counter 82 is initialized to 0 before creating the private character font. Each time the private character font is created or updated, the counter 82 is incremented by one. The updated private character data has a count-up value of the counter 82 as the private character data version number 84. The updated private character data 85 is added to the head of the list of the private character data. In addition, the pointer 83 to the next private character data at the tail of the list of the private character data is given zero as a termination symbol.

Figure 6:
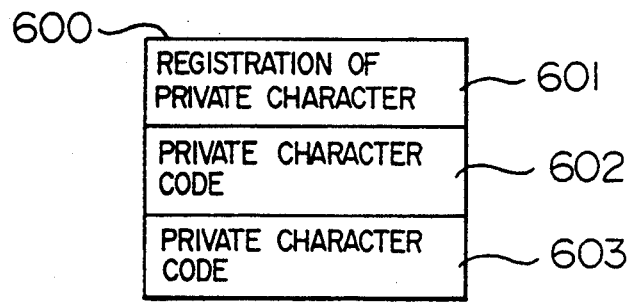
FIG. 6 is an explanatory view showing a command for registering a private character.

Next, a private character registering command 600 will be described as referring to FIG. 6. The command 600 instructs the printer 16 to register the private character font in the font ROM of the printer 16.

A numeral 601 denotes a command type. In addition to the command for registering a private character, there are provided a command for starting the printing and a command for drawing a character string. A numeral 602 is denote private character code indicating the private character font to be registered in the font ROM. A numeral 603 denotes a private character data composing a private character font.

Figure 7:
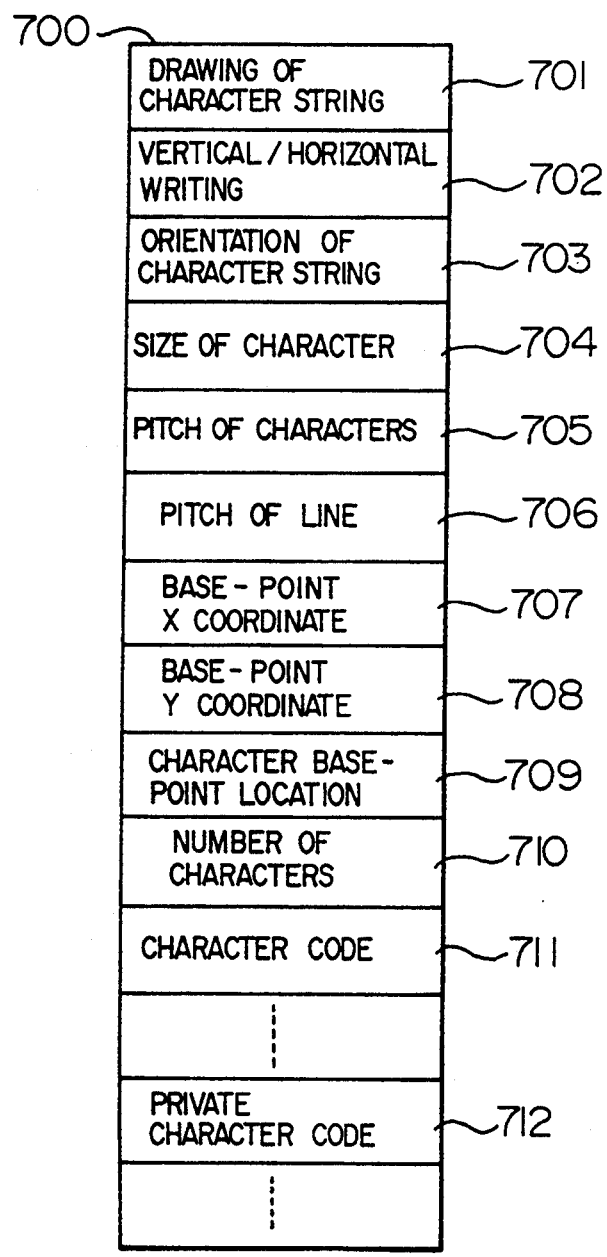
FIG. 7 is an explanatory view showing a command for drawing a character string.

Next, the description will be directed to the command for drawing a character string as referring to FIG. 7. This command instructs the printer 16 to indicate the expansion of a character and a private character into a page memory of the printer 16.

A numeral 701 denotes a command type. Numerals 702 to 710 are parameters of the command. Those parameters are followed by a character code 711 and a private character code 712. Like the arrangement shown in FIG. 5, numerals 702 to 706 and 710 denote specifications about vertical/horizontal writing, an orientation of a character string, a size of a character, a pitch of a character, and a number of characters, respectively. Numerals 707 to 709 represent the values obtained from the line pitch 49 to the character base point address 52 and the number of lines expanded in the page memory.

In turn, the description will be directed to the transferring and printing process of the document file 40 and the private character font in a system having the server 1 and the client 2 arranged as described above with reference to FIGS. 1 and 2.

Figure 1B:
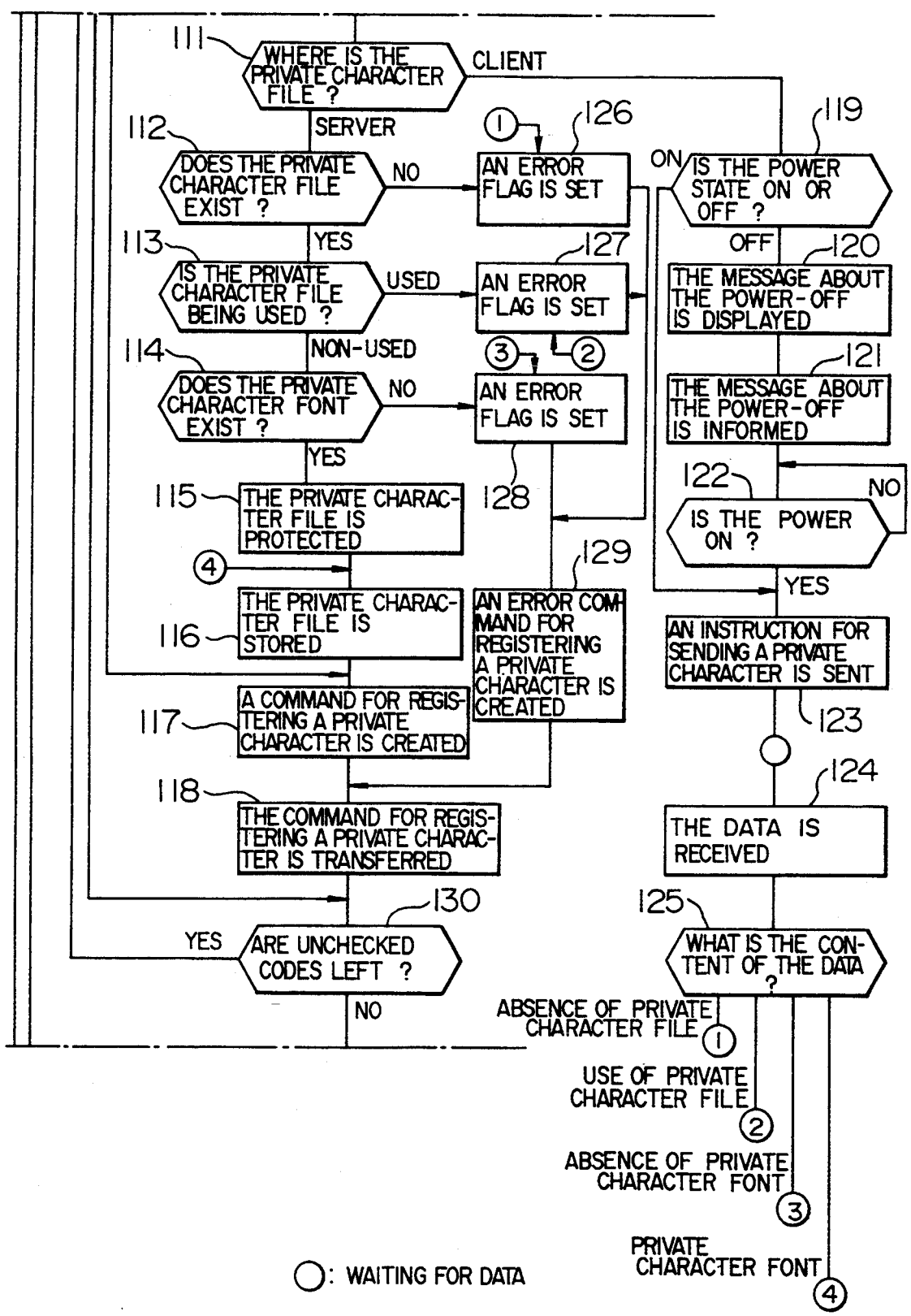
Figure 1C:
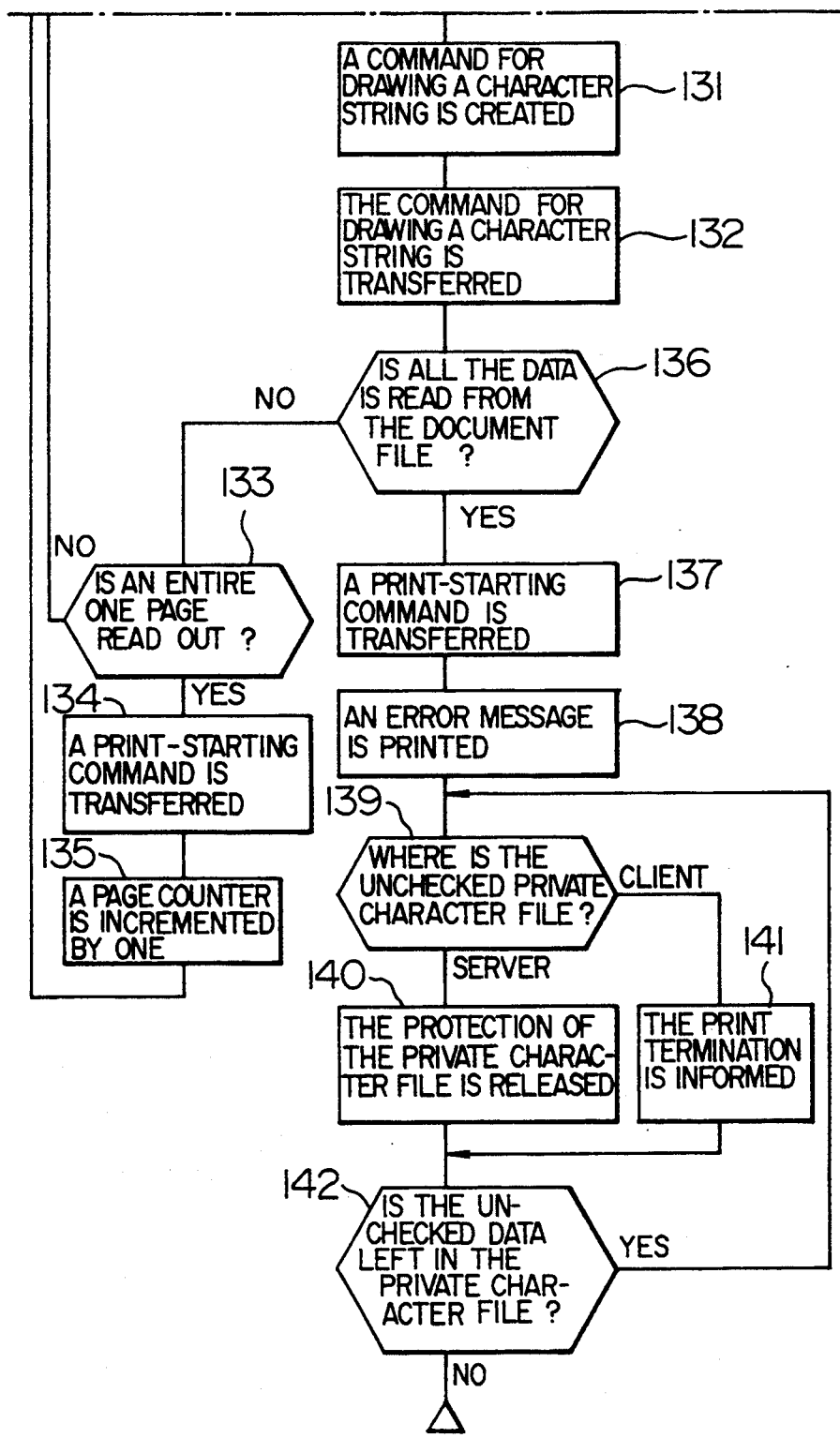

As shown in FIGS. 1A–1C, a numeral 100 denotes a printing process executed in the server 1. In FIGS. 2A to 2D, a numeral 200 (see FIG. 2A) denotes a process of sending a document file from the client 2. A numeral 220 (see FIG. 2B) denotes a process of sending a private character font to the server 1. A numeral 240 (see FIG. 2C) denotes a process of terminating the printing process, which is executed in the server 1. A numeral 260 (see FIG. 2D) denotes a process of displaying an error.

At first, the description will be directed to the document file sending process 200 executed in the client 2.

In the client 2, when the document file 40 is specified and the specified document file 40 is specified to be printed (step 201), the document file 40 is sent to the server 1 (step 202).

Next, the description will be directed to the private character font sending process 220.

When the client 2 receives an instruction for sending a private character font from the server 1 (step 221), it is checked whether or not the private character file 80 for storing the private character font is provided on the client 2. If the private character file 80 is provided, it is checked whether or not the private character file 80 is being used (step 223). When the private character file 80 is not used, it is checked whether or not the private character file 80 contains the private character data 85 corresponding to the private character font version number 59 written in the document file 40 (step 224). If affirmed, a flag is set for permitting only reading of the private character file 80 (step 225), and the private character data 85 in the private character file 80 composing the private character font of the private character code 57 is sent to the server 1 (step 226). It is possible to display a message indicating that the client power is not turned off. If a mechanism is provided for physically inhibiting the power-off of the client, the mechanism may be started to inhibit the power-off of the client. If the private character file 80 is not provided, the file 80 is being used, or no private character font is provided in the file 80, the message is informed to the server 1 (steps 227 to 229). If that client is a client requesting the server 1 to print the document, the error message may be displayed on the client.

In turn, the description will be directed to the process 240 of terminating the print. When the client receives a message about print-termination from the server 1 (step 241), the flag is cleared for permitting only reading of the private character font.

Next, the description will be directed to the process 260 of displaying an error. When the client receives a message indicating that the client storing the private character file is powered off from the server 1 (step 261), the message is displayed on the requesting client (step 262).

Then, the description will be directed to the printing process 100 executed in the server 1.

When the server 1 receives the document file 40 from the client 2 (step 101), a page counter is reset (step 102) and a line counter is also reset (step 103). A one-line character string is sequentially read from the head of the document file 40 (step 104). The line counter is incremented by one (step 105). The code is sequentially checked from the head of the character string (step 106). If the code is a character code 56, the process at the steps 130 or later is executed. If the code is a private character code 57, it is checked whether or not any checked private character code having the same value as and the different font from the private character code 57 is on the same line (step 107), before the font is expanded to the printer 16. This checking operation is carried out by referring to the private character code 57 held at a step 116 (to be described later), a private character file address data number 58, a private character font version number 59, the page counter and the line counter. If such a private character code is not found out, the process at the steps 110 or later is executed. If found, based on the items 45 to 57 shown in FIG. 5, the command 700 for drawing a character string is created (step 108) and the command 700 is transferred to the printer 16 (step 109). Herein, on this line, the character string is drawn on the basis of the character codes located before the currently checked private character code.

Next, it is checked whether or not the private character code 57 is included in the checked private codes (step 110). If it is, the process at the steps 117 or later is carried out. If it is not, a client identifier 43 pointing to the private character file address data number 58 is checked so as to find where the private character file is located (step 111). When the client identifier 43 indicates the server 1, it is checked whether or not the private character file 80 is provided (step 112). If it is, it is checked whether or not the private character file is being used (step 113). If not used, it is checked whether or not the private character data 85 corresponding to the private character font version number 59 written in the document file 40 is included in the private character file 80 (step 114). If affirmed, the flag is set for permitting only reading of the private character file 80 (step 115).

At this point, it is possible to display a message that the server 1 is not permitted to be powered off. If a mechanism is provided for physically inhibiting the power-off of the server, an instruction for inhibiting the power-off is issued so as to stop the power-off of the server 1.

Then, the remaining private character fonts in the private character file 80 are stored in the server 1 (step 116). This storage uses a storage area for the private character font included in the main memory of the server 1. That is, there are stored in the storage area the private character code 57, the private character file address data number 58, the private character font version number 59, the private character data 85, and the count values of the page counter and the line counter. If the private character font has the same private character code 57 but at least one different parameter from another font, it is considered as a different font and is stored in another storage area. The storage is kept for a necessary period for processing the document data.

Next, the command 600 for registering a private character is created from the private character data 82 read from the private character file 80 (step 117). The command 600 for registering a private character is transferred to the printer 16 (step 118). It is checked whether or not all the codes on one character string are checked (step 130). Until all the codes are checked, the process at the steps 106 to 130 is repeated. The creation of the command for registering a private character is carried out by referring to the private character code 57 and the private character data 85 stored in the private character font storing process (step 116).

Next, the command 700 for drawing a character string is created (step 131). Then, the command 700 is transferred to the printer 16 (step 132). If a character string corresponding to a part of one line has been already drawn at the steps 108 and 109, only the remaining part is drawn.

Next, it is checked whether or not all the data is read from the document file 40 (step 136). If the data is left in the file 40, it is checked whether or not the data for one page has been read out (step 133). If the data for one page is not still read out, the process returns to the step 104 at which the data for the next line is read out. Until all the data for one page is read out, the process at the steps 104 to 133 is repeated. When the data for one page is read out, the server 1 transfers the command for starting the print to the printer 16 (step 134), and the page counter is incremented by one (step 135). Until the printing of the document file 40 is terminated, the process at the steps 103 to 136 is repeated. When the reading of the document file is terminated, an indication for starting the print is transferred to the printer (step 137).

When it is checked that no private character file 80 is provided, the private character file 80 is being used, or the private character file 80 has no specified private character font at the steps 112, 113 and 114, an error flag is set for indicating the checked result (steps 126, 127, 128). The command of registering a private character is created from a particular font indicating that the private character code has an error (step 129), and then the process at the steps 118 or later is executed. The error message is informed to the client 2 requesting the server 1 to print the document. In the client 2, the error message may be displayed.

At the step 111, if the private character 80 is provided in the client 2, the power of the client 2 is checked (step 119). If the power is on, the server 1 serves to send the instruction for sending the private character font for the private character code 57 in the document file 40, the private character file name 44 pointing to the private character file address data number 58, the private character code 57, and the private character font version number 59 to the client 2 (step 123). Then, the server 1 waits for the private character data 85 composing the private character font. If the power is off, a message indicating that the client 2 is powered off is displayed on the server 1 (step 120), and the message is sent to the client 2 requested to print the document file 40 (step 121). Then, the server 1 waits until the client 2 is powered on. When the client 2 is powered on (step 122), the process at the step 123 or later is executed.

Next, when the server 1 receives the data from the client 2 (step 124), the server 1 checks the content of the data (step 125). If the data is the private character font, the process at the steps 116 or later is executed. If the data indicates a message that the private character file 80 is not provided, the private character file 80 is being used, or no specified private character font is included in the private character file 80, the error flag is set for indicating the proper message (steps 126 to 128). Then, the process at the step 129 or later is executed.

After printing of the document file 40 is completed, if an error flag remains, an error message is printed (step 138). Finally, an address data 41 of private character file is checked (step 139). As a result of the check, if the private character file 80 is present in the server 1, the flag is cleared to release permission of only reading the private character file 80. If the private character file 80 is present in the client 2, it is informed to the client 2 that the printing is completed (step 141). It is checked whether or not address data 41 of the private character file having not yet been checked remain (step 142), and the processing steps 139–142 are repeated until all address data 41 of private character file are checked.

In the above-described embodiment, when the client requests the server to print a document file, the client sends only the document file to the server. If the document file contains a message that the private character file being used in the document file exists in the client, the server operates to read the necessary private character font from the client immediately before printing the document file. This operation makes it possible to save the time consumed in an process of determining the character code, which has been executed before transferring the document file the client requests the server to print in the conventional technique. Further, if the private character file being used in the requested document file is provided in either one of the client and the server, the document file is allowed to be printed in the server as keeping the correct private character on paper.

The above-described embodiment has disclosed the system for managing a private character, which is required for printing a document file. According to another embodiment of the invention, the system for managing merge data has been disclosed. The hardware arrangement of the server 1 and the client 2 is the same as that described in the foregoing embodiment.

Figure 8:
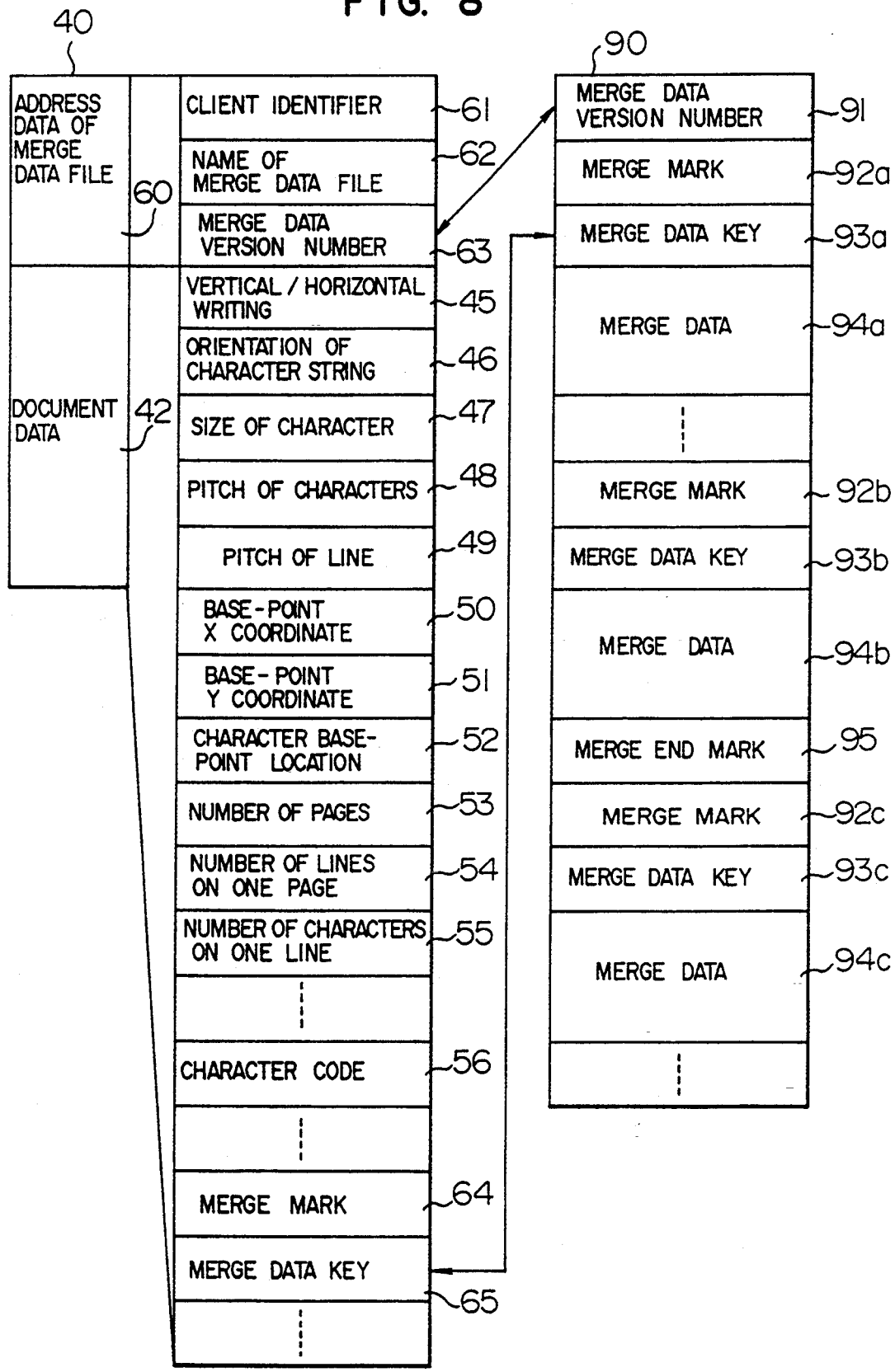
FIG. 8 is an explanatory view showing an arrangement of a document file and a merge data file used in a second embodiment of the present invention.

The description will be directed to the arrangement of the document file 40 and the merge data file 90 as referring to FIG. 8.

At first, the document file 40 will be described.

The document file 40 includes a data 60 standing for an address of a merge data file indicating an address of a merge data file 90 specified by a user and a document data 42 containing a character code 56. The merge data file address data 60 contains an identifier 61 indicating a client 2 or a server 1 having the merge data file 90 stored therein, a merge data file name 62, and a version number 63 of the merge data file. The document data 42 contains parameters 45 to 55 for regulating the arrangement of the document data, a character code 56, a merge mark 64 indicating a merge address of the merge data 93, and a merge data key 65.

Then, the merge data file will be described.

The merge data file 90 contains a merge data version number 91 indicating an update time of the merge data file 90, a merge mark 92 indicating a start of the merge data, a merge data key 93 indicating a merge address of the merge data, a merge data 94, and an merge end mark 95 indicating an end of each pair of merge data (92a to 94a and 92b to 94b). Like the embodiment shown in FIG. 5, the update time of the merge data file 90 is allowed to be counted by setting the counter with the software.

Next, the description will be directed to the process of printing the document file 40 to be merged. The basic flow of the process is analogous to the process of printing the document file 40 containing the private character as described in the foregoing embodiment. Hence, reference is made of the drawings used for describing the foregoing embodiment.

When the server 1 receives the document file 40 from the client 2, the server 1 operates to read the merge data file 90 indicated by the merge data file name 62 from the client or the server indicated by the client identifier 61 described in the document file 40. The server 1 reads the document file 40 one line by one line. If the merge mark 64 and the merge data key 65 is included in the read data, the merge mark 64 and the merge data key 65 are replaced with the merge data 94 following the merge data key 93 included in the merge data file 90 for the merge data key 65. Next, the command 700 for drawing a character string is created, and then the command 700 is transferred to the printer 16. Until all the document file 40 is read out, the foregoing process is repeated. Then, until all the pairs of the merge data are read out from the merge data file 90, the foregoing process is repeated.

With the foregoing process, if any client or server contains the merge data file for storing the merge data to be merged in the document file the client requests the server to print, the document file is allowed to be printed without having to merge another merge data. According to this embodiment, therefore, when the client requests the server to print the document file, the server enables to correctly print the document file if not the server but the client has the necessary resources such as the merge data and the fixed form.

The foregoing embodiments are designed to implement a process of printing a document at a one-line unit. However, the present invention is not limited to the implementation. As another design, it is possible to implement a process of printing a document at a one-character unit. The below-described embodiment will concern with the latter implementation and will be described with reference to FIGS. 9 and 10. Like the foregoing embodiment, the hardware system required for executing this embodiment is the same as that shown in FIGS. 3 and 4. Further, a document file and a private character file shown in FIG. 5 are included in this embodiment.

Figure 9A:
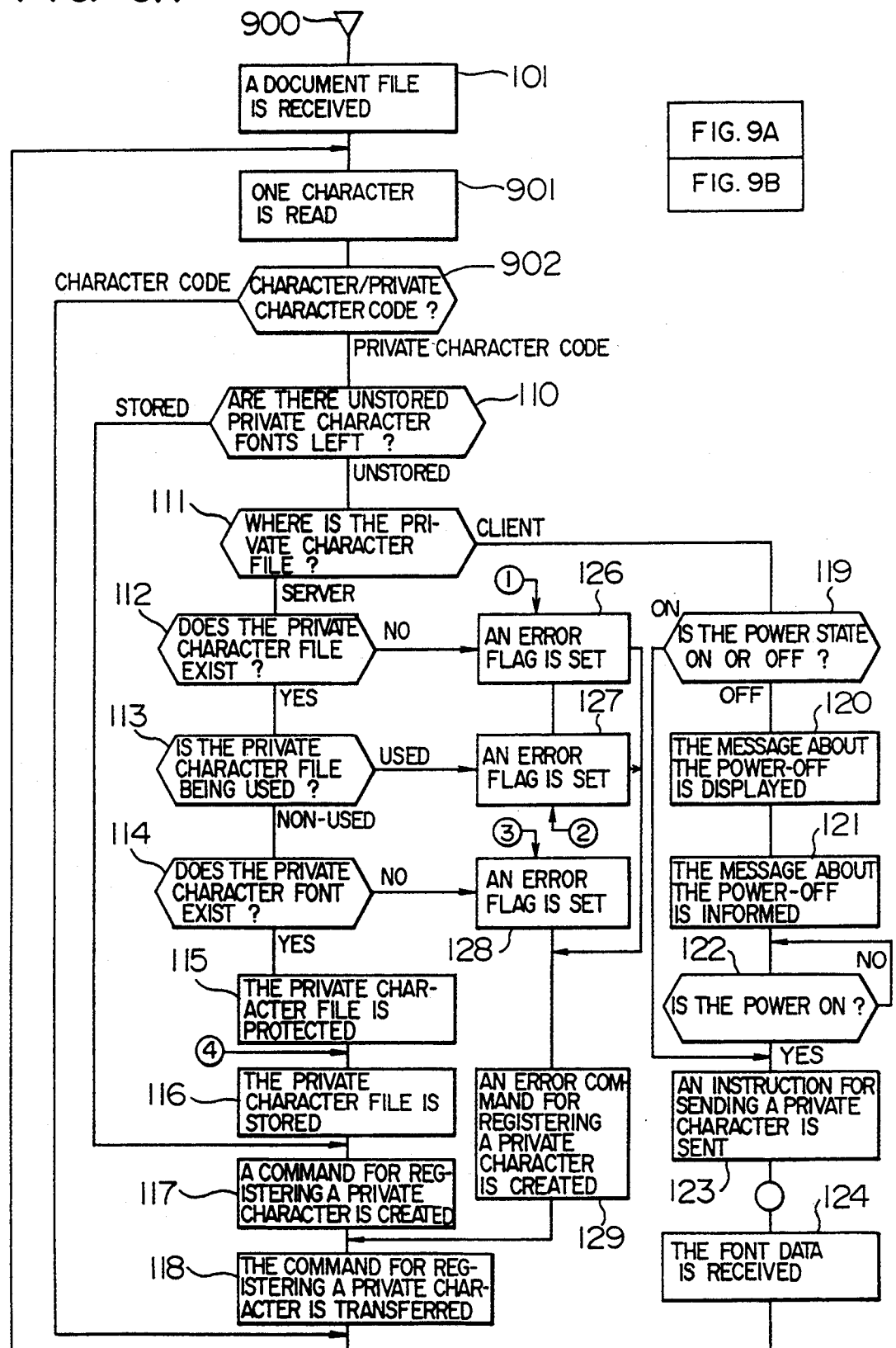
FIGS. 9A to 9B collectively are flowcharts showing a printing process executed by a server according to a third embodiment of the present invention.
Figure 9B:
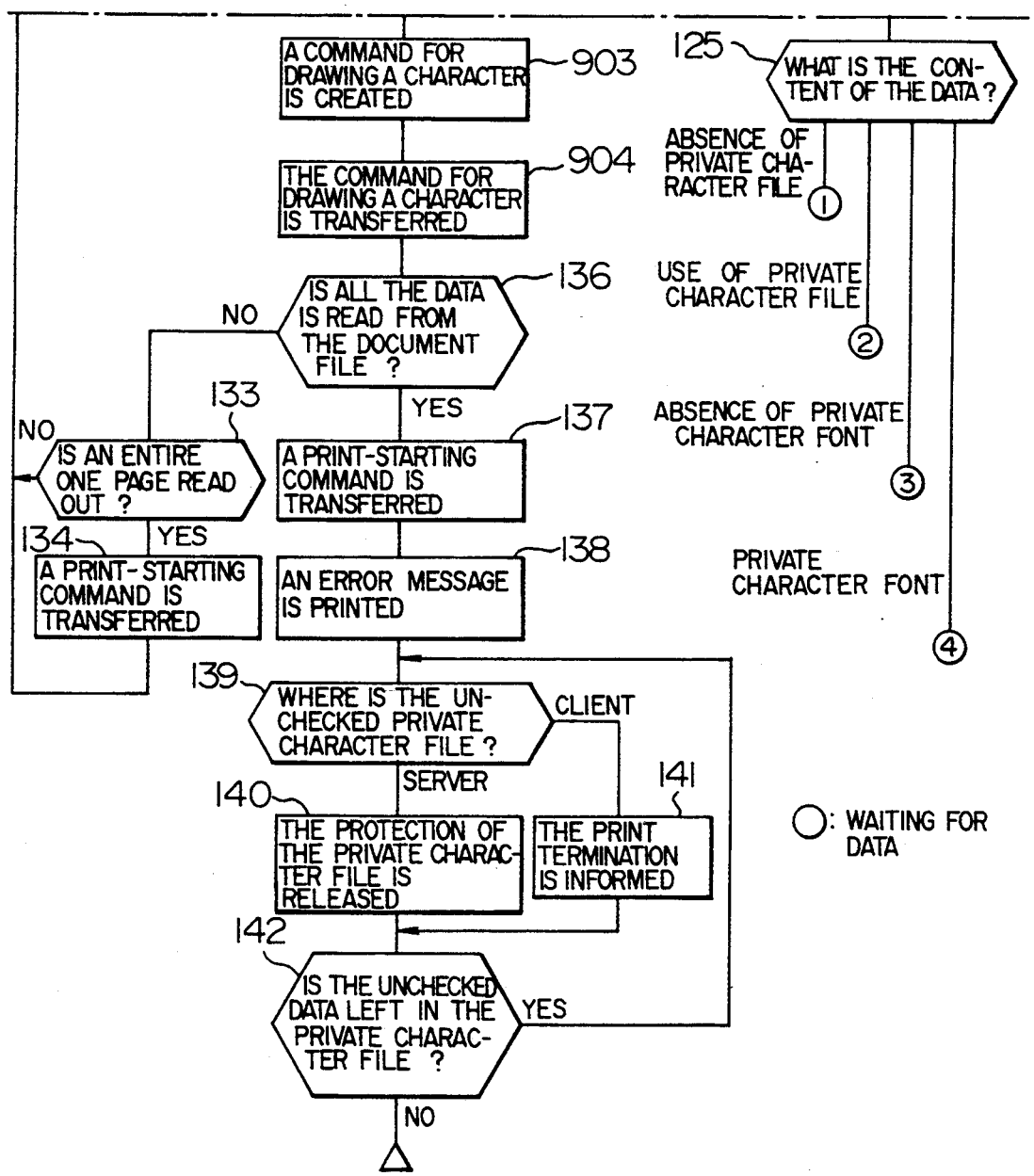
Figure 10:
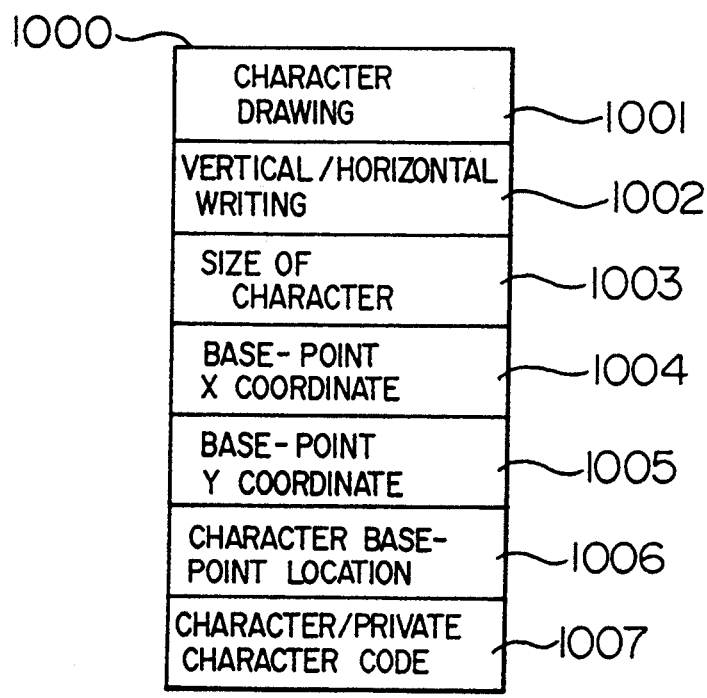
FIG. 10 is an explanatory view showing a command for drawing a character.

In FIGS. 9A and 9B, when a server 1 receives a document file 40 from a client 2 (step 101), the server 1 reads the document of the document file 40 from its head in a one-character-by-one-character manner (step 901). The server 1 determines if the read character is a character code or a private character code (step 902). If the code is a character code 56, the process at the step 903 or later is executed. If the code is a private character code 57, it is checked whether or not the private character code 57 is included in the checked private character code (step 110). If it is, the process at the step 117 or later is executed. If it is not, the server 1 checks a client identifier 43 pointing to a data number 58 standing for an address of a private character file so as to find where the private character file is located (step 111). If the client identifier 43 points to the server 1, it is checked whether or not the server 1 includes the private character file 80 (step 112). If it does, it is checked whether or not the private character file is being used (step 113). If it is not, it is checked whether or not the private character file 80 includes the private character data 85 indicated by a private font version number 59 written in the document file 40 (step 114). If it does, a flag is set for permitting only reading of the private character file 80 (step 115). At this point, a message may be displayed wherein the server 1 is disallowed to be powered off. If a mechanism is provided for physically inhibiting the power-off of the sever 1, the mechanism may be actuated.

Further, the remaining private character fonts contained in the private character file 80 are stored (step 116). In actual, the private character code 57, the private character file address data number 58, the private character font version number 59, and the private character data 85 are stored in a private character font storage area of the main memory 11.

Next, a command 600 of registering a private character is created from the private character data 82 read from the private character file 80 (step 117). The command 600 is transferred to the printer 16 (step 118). Herein, the command 600 is created by referring to the private character code 57 and the private character data 85 stored under the process of storing a private character font (step 116).

In turn, a command 1000 for drawing a character is created (step 903). Then, the command 1000 is transferred to the printer 16 (step 904).

It is checked whether or not all the data is read from the document file 40 (step 136). If not, it is checked whether or not the one-page data is read (step 133). If yes, a print-starting command is transferred to the printer 16 for instructing the printer 16 to start the printing operation (step 134). Until all the data in the document file 40 is printed, the process at the steps 901 to 136 is repeated. When all the data is read out of the document file, the print-starting command is transferred to the printer (step 137).

If the private character file 80 is not provided, the file 80 is being used, or no specified private character font is included in the file 80 at the steps 112, 113 and 114, the same operation as that of the embodiment shown in FIGS. 1A-1C is carried out.

Upon the termination of printing the document file 40, if an error flag is set, the same operation as that of the embodiment shown in FIGS. 1A-1C is carried out.

According to the present embodiment, when the client requests the server to print a document file, only the document file is sent from the client to the server. In a case where the document file has a description that the private character file used in the document file is provided in the client, immediately before printing the document file, the server reads the necessary private character fonts from the client. This operation makes it possible to save the time consumed in determining a type of a character code before transferring the document file the client requests the server to print. If any client or the server may include the private character file used in the document file the client requests the server to print, the document file is allowed to be printed as keeping the correct private character on paper.

According to the foregoing embodiments, when the client requests the server to print the document file, the private characters of the document file are allowed to be correctly printed even if the necessary private character fonts are included not in the server but in the client.

The foregoing embodiments have been described with respect to the system for managing the private characters and merge data required to print a document file. This system may apply to managing fixed forms.

In the descriptions of the foregoing embodiments, the system for managing resources is arranged to have a document file as a first resource and a private character or merge data as a second resource and print the document file by using the second resource. This system, however, may manage the resources if it is used for the general processing such as edition.

Moreover, in the foregoing descriptions, the two information processing units are connected through a data transfer means. This invention may apply to the system having three or more information processing units through the data transfer means. In this case, it goes without saying that the private character file may be provided in any information processing unit except the client and the server. Hence, the process of transferring the private character font (merge data and a fixed form, for example) from the client to the server, described above, may apply to the process of transferring the private character font from any unit except the client to the server.

What is claimed is:

1. In an information processing system having at least three information processing units and a data transmission means connecting said information processing units, a method for managing resources comprising the steps of:

when an information processing unit serving as a client requests another information processing unit serving as a server to process a resource, applying to a first resource to be processed information data indicating an address of at least one second resource to be used for processing said first resource and transferring said first resource together with said information data from said client to said server;

checking by said server of said information data sent from said client together with said first resource for ascertaining if said server holds the second resource required for processing said first resource; and if said server does not hold said second resource, transferring said second resource to said server from an information processing unit having said second resource data by indicating an address of said second resource to be applied to said first resource.

2. The method for managing resources as claimed in claim 1, wherein said information data contains an identifier pointing to an information processing unit having said second resource and a name of a file for storing said second resource.

3. The method for managing resources as claimed in claim 2, wherein said first resource contains a code indicating said second resource and a pointer pointing to an address of a second resource storage file for storing the second resource corresponding to said code.

4. The method for managing resources as claimed in claim 3, wherein when the second resource corresponding to the code is newly created and is registered in said second resource storage file, an update time of said second resource is recorded in said second resource storage file and a latest update time is added to said second resource as an information standing for a version of said second resource.

5. The method for managing resources as claimed in claim 4, wherein said first resource is document data, and said second resource is private character font data, and said process requested by the server is printing.

6. The method for managing resources as claimed in claim 5, wherein information indicating a version of said private character font data is held in the document data in a manner to make said version information correspond to private character font.

7. The method for managing resources as claimed in claim 6, wherein if a code for a private character is included in the document data, the private font for said code is read from said second resource storage file for storing said private character font and is temporarily held in said server together with the information indicating said private character font and said version.

8. The method for managing resources as claimed in claim 4, wherein said server executes the printing process by referring to the information indicating a version added to said code included in said document data and by using the private character font for said version.

9. The method for managing resources as claimed in claim 4, wherein the first resource is document data, said second resource is merge data, and said process requested by the server is printing.

10. The method for managing resources as claimed in claim 1, wherein if said second resource is included in another information processing unit other than said client, it is checked whether or not the information processing unit is being operated, and if it is being operated, a command is issued to said information processing unit for sending said second resource to said server.

11. The method for managing resources as claimed in claim 10, wherein if the information processing unit having said second resource is not being operated, the information indicating that the second resource is not available is output and the information processing unit is monitored for checking when it is operated.

12. The method for managing resources as claimed in claim 1, wherein if the necessary second resource is not available, the said server outputs information indicating that the second resource is not available.

13. The method for managing resources as claimed in claim 12, wherein if the second resource is not provided and is being used by another process, an error message is output.

14. The method for managing resources as claimed in claim 1, wherein if said second resource is included in another information processing unit, a command for inhibiting a power-off of the information processing unit is sent to said information processing unit having said second resource.

15. An information processing system having a plurality of more than two information processing units and a data transmission means connecting said information processing units, one of said information processing units serving as a client including means for applying information for indicating addresses of one or more second resources required for processing a first resource, and means for sending said first resource to another information processing unit serving as a server;

the information processing unit serving as a server including means for determining whether or not said server holds each of said second resources required for processing said first resource, in response to the receipt of said first resource from said client, means for requiring the information processing units having the second resources not held in said server to send said second resources to said server, based on the information indicating an address of said second resources, according to the determined result of said determining means, means for receiving said second resource sent from said information processing unit, means for processing said first resource by using the second resource received, said means for processing said first resource being connected to said determining means and said second resource receiving means.

16. The information processing system as claimed in claim 15, wherein said means for applying the information indicating the address of the second resource comprises an identifier indicating the information processing unit having said second resource and a name of a file for storing said second resource as the information indicating the address of the second resource.

17. The information processing system as claimed in claim 16, wherein the first resource is document data, the second resource contains at least one of private character fonts, merge data and fixed forms, and the process executed by the server is printing.

18. The information processing system as claimed in claim 17, wherein the second resource is the private character fonts, and means for applying the information indicating an address of the resource serves to store in the document data private character codes and pointers pointing to addresses of private character files for storing the private character fonts for said private character codes.

19. The information processing system as claimed in claim 18, wherein the information processing unit serving as the client includes means for registering the data about private character fonts created to correspond to the private character codes in said private character file, and said registering means include means for counting an update time of the font data about the code if the font data is registered in said private character file and means for applying the counted update time to said font data as the information indicating a version of said font data.

20. The information processing system as claimed in claim 19, wherein means for applying the information indicating an address of the second resource holds the information indicating a version of the private character font as keeping said version information corresponding to the private character code.

21. The information processing system as claimed in claim 20, wherein means for processing the first resource includes means for temporarily holding the font data corresponding to the private character code of the private character included in the document data sent from the information processing unit serving as the client together with the information indicating the private character code and the version.

22. The information processing system as claimed in claim 20, wherein each of said information processing units includes a central processing unit, a storage device, an I/O device, and a display device.

23. The information processing system as claimed in claim 22, wherein the information processing system serving as the server further includes a printer.

24. The information processing system as claimed in claim 23, wherein said means for processing the first resource further provides means for referring to the information indicating the version of the private character font included in the document data and sending the font data of the corresponding version to a printer, and said printer draws said private character by using the sent font data when it prints the document.

* * * * *